United States Patent [19]

Schrader

[11] 4,052,284

[45] Oct. 4, 1977

[54] APPARATUS FOR ELECTROCHEMICALLY FORMING A PLURALITY OF ARTICLES

[75] Inventor: Gustav E. Schrader, Pepper Pike, Ohio

[73] Assignee: TRW Inc., Cleveland, Ohio

[21] Appl. No.: 681,779

[22] Filed: Apr. 30, 1976

[51] Int. Cl.² .................... C25D 17/00; C25D 17/12
[52] U.S. Cl. .............................. 204/224 M; 204/225; 204/280; 204/297 R
[58] Field of Search ................ 204/224 M, 225, 129.5, 204/129.1, 224 R, 284, 286, 280, 297 R

[56] References Cited

U.S. PATENT DOCUMENTS

| 3,459,645 | 8/1969 | Wilson et al. | 204/224 M |
| 3,515,659 | 6/1970 | Broat et al. | 204/224 M |
| 3,746,827 | 7/1973 | Martin et al. | 204/129.5 X |

FOREIGN PATENT DOCUMENTS

| 2,153,135 | 5/1973 | Germany | 204/129.1 |
| 1,218,546 | 1/1971 | United Kingdom | 204/224 M |

Primary Examiner—John H. Mack
Assistant Examiner—D. R. Valentine

[57] ABSTRACT

An improved apparatus for forming a plurality of airfoils or other articles includes a plurality of pairs of electrodes which are utilized in the electrolytic removal of material from opposite sides of a workpiece at a plurality of spaced apart locations to form side surfaces of a plurality of airfoils. The electrodes are constructed so that a group of airfoils is formed along each of a pair of opposite minor sides of a workpiece. In one specific instance, a plate having the configuration of a rectangle is utilized. This plate may have a size such that only one end portion of the plate will fit in a working chamber at a time. After a plurality of airfoils have been formed in one end portion of the plate, the plate is withdrawn from the working chamber and the opposite end portion of the plate inserted into the working chamber. In another specific instance, the workpiece included a support frame in which a plurality of partially formed airfoils are mounted. A plurality of pairs of electrodes are utilized to electrolytically remove material from opposite sides of the partially formed airfoils. During the electrolytic removal of material from opposite sides of the workpiece to form the airfoils, electrolyte flows axially along each of the side surfaces of the airfoil from a tip end portion toward a root end portion of the airfoil.

27 Claims, 14 Drawing Figures

FIG. 14

APPARATUS FOR ELECTROCHEMICALLY FORMING A PLURALITY OF ARTICLES

BACKGROUND OF THE INVENTION

This invention relates to a new and improved apparatus which is utilized to at least partially form a plurality of airfoils or other articles by electrolytically removing material from the workpiece.

Machines have been utilized to form airfoils by the electrolytic removal of material from a workpiece. One of these machines is disclosed in U.S. Pat. No. 3,554,892. The machine disclosed in this patent utilizes a pair of cathode electrodes to form turbine blades or airfoils one at a time in an elongated workpiece. A machine constructed generally in accordance with this patent is effective to sequentially form a plurality of airfoils. It has been suggested that each electrode of this machine could be provided with a plurality of fixedly interconnected face surfaces to simultaneously form a plurality of airfoils.

Machines for sequentially operating on a plurality of workpieces to form airfoils by electrolytically removing material have been described. Since these machines simultaneously operate on a plurality of workpieces to form airfoils, the rate of production of these machines may be somewhat greater than the production rate of a machine which operates on only a single workpiece to form one airfoil at a time. Machines in which material is moved from a workpiece at each of a series of work stations in turn by electrochemical operations to form airfoils are disclosed in U.S. Pat. Nos. 3,459,645 and 3,466,235. It should be noted that these patents contemplate that the workpiece will be moved in succession to each of a plurality of work stations and do not contemplate the forming of a plurality of turbine blades or airfoils at one work station. Other known prior art devices which utilize a plurality of electrodes to electrolytically remove material from a workpiece are disclosed in U.S. Pat. Nos. 3,594,298; 3,547,797; 3,436,311 and 3,287,245.

The machines disclosed in the aforementioned prior art patents all contemplate that a flow of electroylte will be established between a workpiece which forms an anode electrode and a cathode electrode having a working or face surface with a configuration corresponding to the desired configuration of the workpiece. In many prior art machines which are utilized to form airfoils, this flow of electrolyte has been directed between the leading and trailing edge portions of the airfoil in the manner disclosed in U.S. Pat. No. 3,372,099. However, it has also been suggested that an electrode could be moved axially along an airfoil and the flow of electrolyte conducted axially along the surface of the airfoil in the direction of movement of the electrode in the manner described in U.S. Pat. No. 3,803,009.

Although most prior art machines move the electrodes in a direction which is perpendicular to the major side surface of a workpiece in the manner disclosed in U.S. Pat. No. 3,554,892, during certain electrochemical machining operations an electrode has been moved along a path extending at an angle to a side surface of a workpiece. Thus, in U.S. Pat. No. 3,795,604 a tubular electrode for drilling small holes is moved at an acute angle in the major side surface of a workpiece. It should be noted that this patent does not contemplate moving a plurality of electrodes at acute angles relative to the workpiece to form opposite sides of an airfoil.

SUMMARY OF THE PRESENT INVENTION

An improved apparatus for at least partially forming a plurality of articles, such as airfoils, includes a plurality of separately movable electrodes which are utilized to effect the electrolytic removal of material from opposite sides of the articles at spaced apart locations. The articles are formed in two separate groups each of which is disposed along an associated minor side surface of a workpiece. This is accomplished by moving the electrodes along paths extending at acute angles to the major and minor side surfaces of the workpiece. As the electrodes are moved toward the workpiece, electrolyte is directed along flow paths which extend axially along the surfaces of the articles. When airfoils are being formed, electrolyte flows from tip end portions of the airfoils inwardly toward the center of the workpiece to the root portions of the airfoils. In order to provide for at least partially offsetting operating forces on a workpiece, the surfaces of the airfoils along one minor side of the workpiece slope in one direction relative to the major side of the workpiece while the surfaces of airfoils along the other minor side of the workpiece slope in the opposite direction.

In one specific instance, the apparatus is utilized to form a plurality of airfoils in a unitary workpiece formed by a rectangular piece of bar stock. In another specific instance, the apparatus is utilized to form a plurality of airfoils in a workpiece which includes a support frame in which there is disposed a plurality of partially formed airfoils. It is contemplated that many different types of workpieces other than the two aforementioned workpieces could be utilized if desired.

Accordingly, it is an object of this invention to provide a new and improved apparatus for forming an article by electrolytically removing material from a workpiece and wherein the apparatus includes a plurality of pairs of electrodes which are movable relative to opposing sides of a workpiece to effect the electrolytic removal of material from the opposing sides of the workpiece at each of a plurality of spaced apart locations to at least partially form a plurality of articles.

Another object of this invention is to provide a new and improved apparatus as set forth in the next preceding object and wherein a flow of electrolyte is directed axially along the side surfaces of the articles during the electrolytic removal of material from the workpiece.

Another object of this invention is to provide a new and improved apparatus for electrochemically forming surface areas in a workpiece and wherein the apparatus includes a first electrode arrangement to simultaneously form opposite side surface areas of a plurality of articles on one side of the center of the workpiece and a second electrode arrangement to simultaneously form opposite side surface areas of a second plurality of articles on the other side of the center of the workpiece.

Another object of this invention is to provide a new and improved apparatus set forth in the next preceding object and wherein the surfaces of the articles on one side of the center of the workpiece have a first angular orientation while the surfaces of the articles on the other side of the center of the workpiece have another angular orientation.

Another object of this invention is to provide a new and improved apparatus for electrochemically forming surface areas in a workpiece which includes a plurality formed articles disposed on a frame.

BRIEF DESCRIPTION OF THE DRAWINGS

The foregoing and other objects and features of the present invention will become more apparent upon a consideration of the following description taken in connection with the accompanying drawings wherein.

DESCRIPTION OF THE PREFERRED EMBODIMENTS OF THE INVENTION

Figure 1:
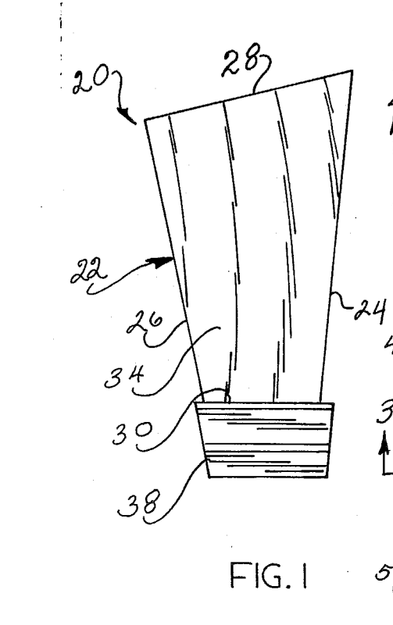
FIG. 1 is an illustration of an airfoil or turbine blade formed in accordance with the present invention.

An airfoil 20 which, the illustrated embodiment is a turbine blade, includes a twisted blade 22 having leading and trailing edge portions 24 and 26 which extend between the tip and root portions 28 and 30 of the airfoil. Although only a single side surface 34 of the airfoil 20 is visible in FIG. 1, it should be understood that the airfoil has a pair of major side surfaces which have a twisted configuration to promote a desired flow of fluid. The airfoil 20 has a base portion 38 which, during use, is mounted in a fixture in a known manner to position the airfoil. Although it is contemplated that the airfoil 20 will be utilized in a turbojet engine, it is contemplated that a product formed with the apparatus of the present invention could be utilized in many different environments. It is also contemplated that the apparatus of the present invention could be utilized to form articles other than airfoils.

Figure 5:
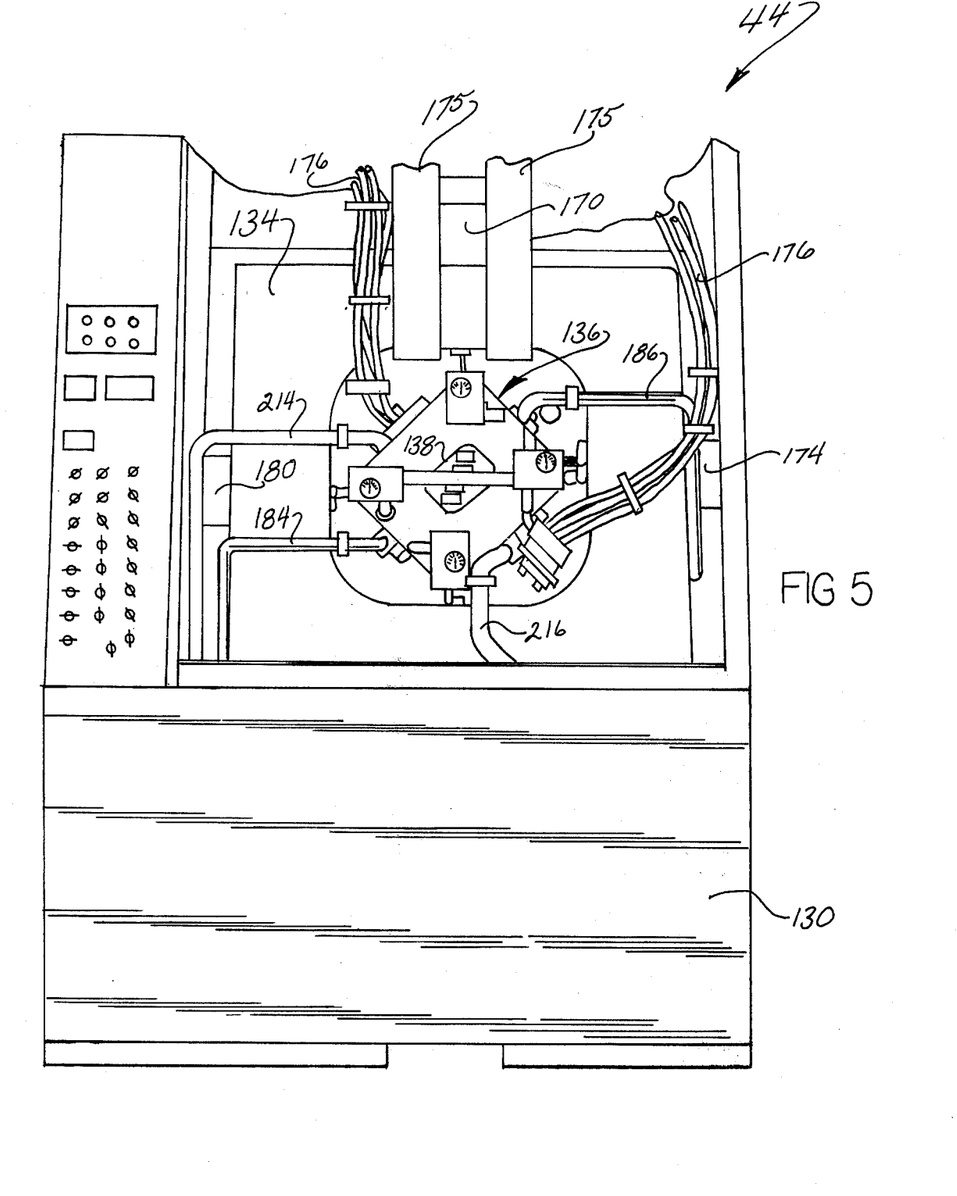
FIG. 5 is an illustration of a machine utilized in forming the airfoils in the workpiece of FIG. 2.

In accordance with a feature of the present invention, a plurality of articles, such as the airfoils 20, are simultaneously formed in a specific workpiece 42 (see FIG. 2) by a machine 44 (see FIG. 5). Prior to machining of the unitary steel workpiece 42, it has the configuration of a rectangular block with flat parallel major side surfaces 48 and 50 which are interconnected by a first pair of flat parallel minor side surfaces 52 and 54 and a second pair of flat parallel minor side surfaces 56 and 58. However, it should be understood that workpieces having many different configurations could be utilized if desired. In one specific instance it is contemplated that a nonrectangular workpiece may be utilized.

Figure 2:
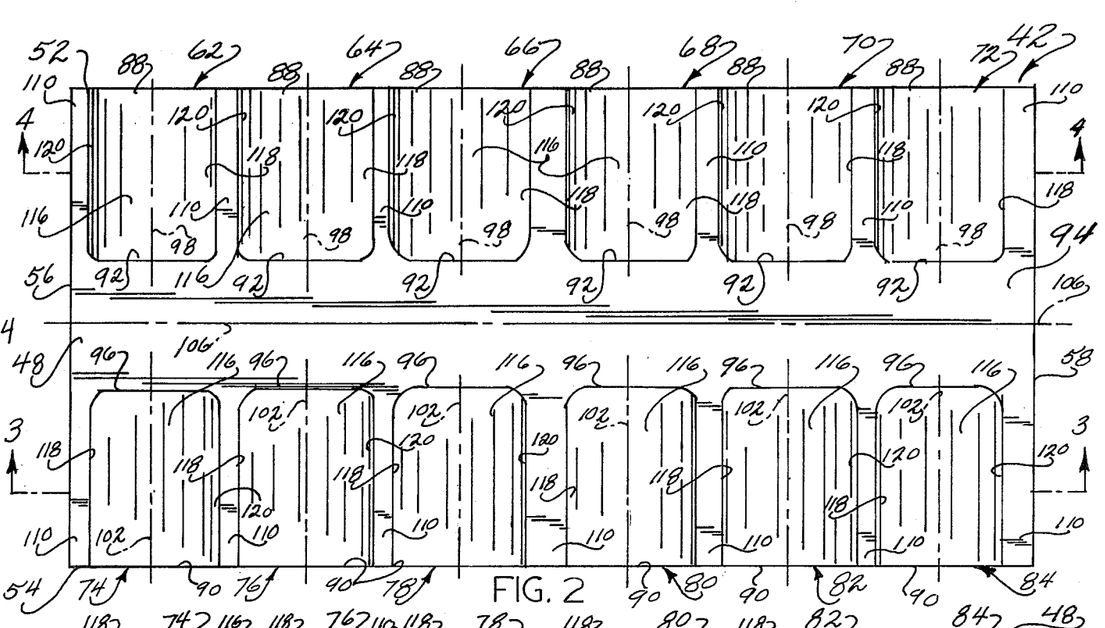
FIG. 2 is a plan view (on a reduced scale) of a workpiece in which a plurality of airfoils have been formed by the electrolytic removal of material from opposite sides of the workpiece.

After a machining operation has been completed on the workpiece 42, a series of turbine blades or airfoils 62, 64, 66, 68, 70 and 72 are formed in a linear array along the minor side 52 of the workpiece with their central axes extending parallel to each other and perpendicular to the minor side 52. Similarly, a second series of airfoils 74, 76, 78, 80, 82 and 84 are formed in a linear array along the opposite minor side 54. The airfoils 62–72 are formed with tip end portions 88 intersecting the minor side 52 of the workpiece 42. Similarly, the airfoils 74–84 are formed with tip ends 90 intersecting the minor side 54 of the workpiece. The root end portions 92 of the airfoils 62–72 are disposed on one side of an unmachined central or body portion 94 of the workpieec 42 while the root portions 96 of the airfoils 74–84 are disposed on the other side of the body portion 94.

The airfoils 62–72 are oriented with their central axes 98 extending perpendicular to the minor side 52 and parallel to each other. The central axes 98 of the airfoils 62–72 intersect the minor side 52 at spaced apart locations therealong. Similarly, the airfoils 74–84 are oriented with their central axes 102 extending parallel to each other and perpendicular to the minor side 54. The central axes 102 of the airfoils 74–84 intersect the minor side 54 at spaced apart locations therealong. The two series of airfoils are disposed in alignment with each other so that the central axes 98 of the airfoils 62–72 are in general alignment with the central axes 102 of the airfoils 74–84. It should be understood that although the airfoils 62–84 are advantageously disposed in the spatial relationship described, certain types of airfoils and other articles may be disposed in a different spatial relationship.

During subsequent processing of the workpiece 42, the workpiece is split along a central axis 106 and the various airfoils are separated from arms or ribs 110 which extend parallel to each other and perpendicular to the minor sides 52 and 54 of the workpiece 42. Once the airfoils have been separated from the arms and the center portion of the workpiece has been split, base end portions of the airfoils 62–84 are formed to have a configuration similar to the base end portion 38 of the airfoil 20 of FIG. 1. Thus, twelve separate airfoils are formed from the single workpiece 42. However, a different number of airfoils or other articles could be formed in the workpiece 42.

Figures 3, 4:
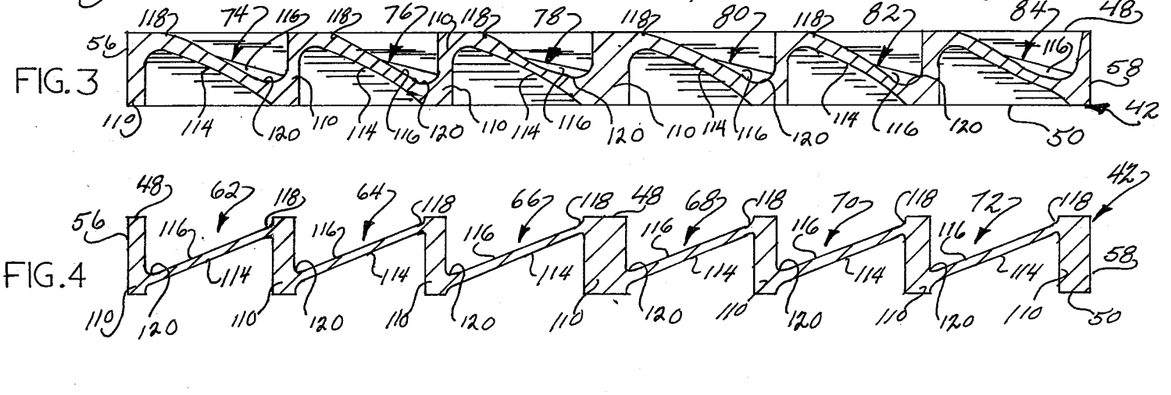
FIG. 3 is a sectional view, taken along the line 3—3 of FIG. 2, illustrating the angular orientation of side surfaces of a plurality of airfoils formed adjacent to one minor side of the workpiece.
FIG. 4 is a sectional view, taken generally along the line 4—4 of FIG. 2, illustrating the angular orientation of side surfaces of airfoils formed adjacent to another minor side of the workpiece.

The airfoils 62–72 have side surfaces which slope in a direction which is opposite to the slope of the airfoils 74–84. This is perhaps best seen by a comparison of FIGS. 3 and 4. In FIG. 3 it can be seen that the airfoils 74–84 have twisted side surfaces 114 and 116 which slope downwardly and leftwardly (as viewed in FIG. 3) from a leading edge portion 118 of the airfoil to a trailing edge portion 120. The airfoils 62–72 when viewed along a section line facing in the same direction, has side surfaces 114 and 116 which slope downwardly and leftwardly (as viewed in FIG. 4) from the leading edge portion 118 of the airfoils to a trailing edge portion 120. It should be noted that this difference in the angular orientation of the airfoils 62–72 enables the workpiece 42 to be split in half along a plane extending through the central axis 106 and perpendicular to the major side surfaces 48 and 50 to form a pair of identical workpiece sections. The upper (as viewed in FIG. 2) workpiece section can be pivoted about a vertical axis to a position in which the leading edge 118 of the airfoil 72 is immediately adjacent to the trailing edge of the airfoil 84 for machining purposes during the formation of the bases and tips of the airfoils.

The machine 44 (FIG. 5) is operable to electrolytically remove metal from the workpiece 42 to form the airfoils in the steel workpiece. The machine 44 has a base frame 130 with a rigid upstanding support section 134 upon which the fixture module or box assembly 136 (see FIGS. 5 and 6) is mounted. The box assembly 136 includes a pocket assembly 138 (FIG. 6) which defines a machining or working chamber 140 in which a pair of guide members 142 and 144 are disposed to generally position the workpiece 42 (not shown in FIG. 6) at a 45° angle to a horizontal plane and with the central axis 106 of the workpiece extending perpendicular to a bottom or base surface 148 of the machining chamber 140. The workpiece 42 is accurately positioned and held in the chamber 140 with a central axis 106 of the workpiece extending along the line of intersection of a horizontal central plane indicated at 152 in FIG. 6 and a vertical central plane, indicated at 154 in FIG. 6.

Figure 6:
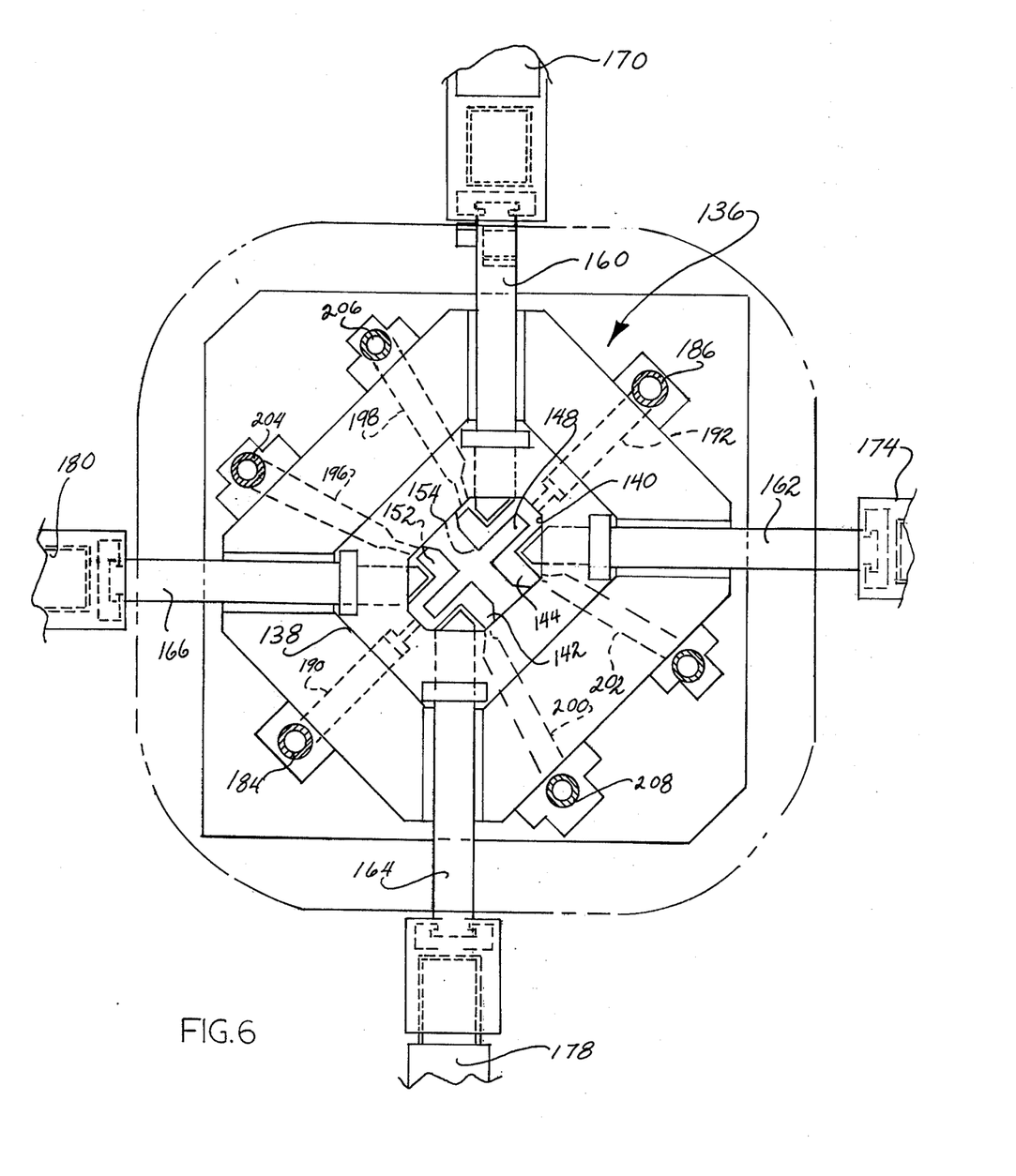
FIG. 6 is an enlarged schematic view of a portion of the machine of FIG. 5, illustrating the relationship between a plurality of electrodes and a working chamber which receives the workpiece of FIG. 2.

The first pair of electrodes 160 and 162 are utilized to form airfoils along minor side 52 of the workpiece while a second pair of electrodes 164 and 166 are utilized to simultaneously form airfoils along the opposite minor side 54 of the workpiece. Each of the electrodes 160, 162, 164, and 166 is associated with a hydraulic ram which is selectively operable to move the electrode along a horizontal or vertical path extending at an acute angle to the major sides 48 and 50 of the workpiece 42. In the illustrated embodiment of the invention, the electrodes 160 through 166 are moved at an acute angle of 45° to the major sides 48 and 50 of the workpiece. However, other acute angles could be utilized to accommodate different articles.

Figure 7:
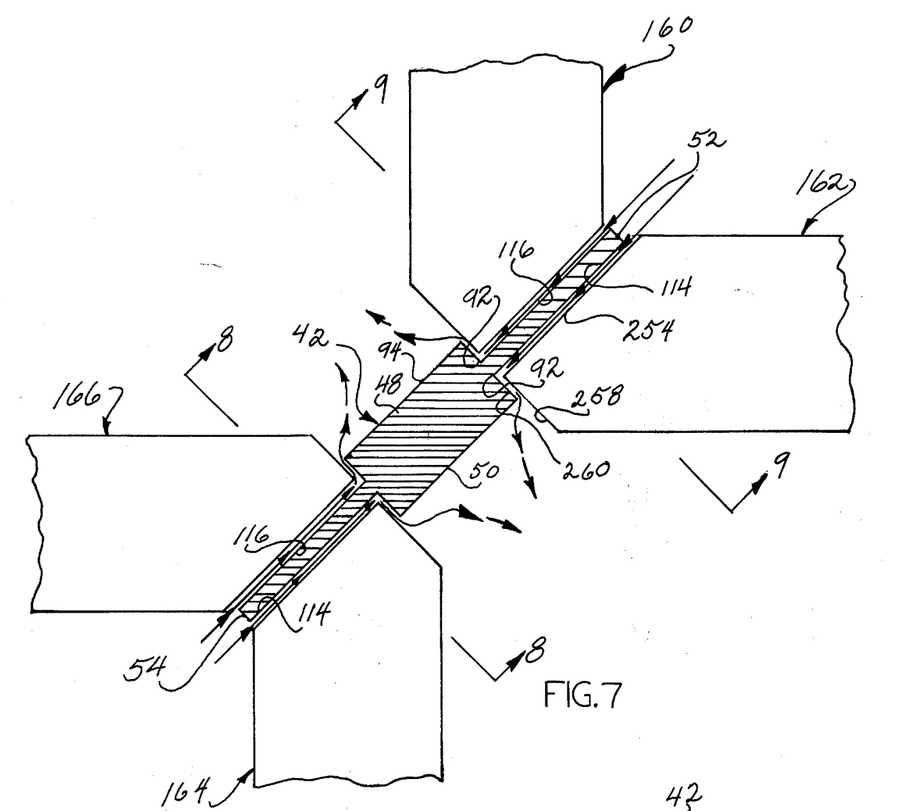
FIG. 7 is a schematic illustration depicting the relationship of the electrodes of FIG. 6 to a workpiece during the simultaneous forming of a plurality of airfoils in the workpiece.

Upon extension of a hydraulic ram 170, an electrode 160 is moved straight downwardly from the retracted position illustrated in FIG. 6 toward the fully extended position illustrated schematically in FIG. 7. Simultaneously with this movement of the electrode 160 from the retracted position to the extended position, a ram 174 is operated to move the electrode 162 horizontally from its retracted position (FIG. 6) to its extended position. It should be noted that the paths of movement of the two electrodes 160 and 162, that is the paths along which the end faces of the electrodes move, intersect at a location disposed above and to the right (as viewed in FIG. 6) of the center of the working chamber 140 and the center of the workpiece. Although the electrodes 160 and 162 simultaneously effect the removal of metal from the workpiece 42, their operating strokes could begin and/or end at different times.

During movement of the electrodes 160 and 162, the electrodes are at a negative potential relative to the workpiece 42 so that the electrodes 160 and 162 are cathodic and the workpiece 42 is anodic. The electrodes 160 and 162 are electrically connected with bus bars 175 (FIG. 5) which are connected with a negative polarity voltage source. The workpiece 42 is electrically connected with heavy duty cables 176 (FIG. 5) which are connected with a positive polarity voltage source.

In accordance with well known electrochemical machining practices, a flow of electrolyte is provided between the electrodes 160 and 162 and the workpiece. This results in the electrolytic removal of metal from the workpiece 42 as the electrodes 160 and 162 move toward the workpiece. The flow of electrolyte is, at least partially, directed by the guide members 142 and 144.

In accordance with a feature of the present invention, the flow of electrolyte is directed from the minor side 52 (FIG. 7) of the workpiece toward the central portion 94 of the workpiece along a pair of flow paths which extend axially along the side surfaces 114 and 116 of the airfoil from the tip 88 to the root 92 of the airfoil. The electrolyte then flows outwardly toward the central portion 94 of the workpiece to drain. The direction of flow of the electrolyte is indicated schematically by arrows in FIG. 7. However, with certain types of airfoils or other articles, the direction of flow of the electrolyte may be reversed. It should be noted that a small gap is maintained between the electrodes 160 and 162 and the workpiece at all times so that there is no electrical shorting between the cathode electrode 160 and 162 and the workpiece which forms the anode electrode. Finishing gaps of between 0.002 inches and 0.005 inches are typically possible with this system to allow for a high degree of accuracy in reproduction of the cathode geometry.

Simultaneously with the formation of the plurality of airfoils adjacent to the minor edge 52 of the workpiece by the electrodes 160 and 162, a pair of rams 178 and 180 (FIG. 6) are operated to move the second pair of electrodes 164 and 166 from their retracted position (illustrated in FIG. 6) to their extended position (illustrated in FIG. 7) to form a plurality of airfoils along the minor side 54 of the workpiece. It should be noted that the paths of movement of the two electrodes 164 and 166 intersect at a location disposed below and to the left (as viewed in FIG. 6) of the coincident centers of the working chamber 140 and workpiece 42. The electrodes 164 and 166 are at a negative potential relative to the workpiece 42 and electrolyte flows axially inwardly along the airfoil side surfaces 114 and 116 in the manner previously explained in connection with the electrodes 160, 162 and indicated schematically by the arrows in FIG. 7. Of course, other articles could have different electrolyte flow paths. Although all four electrodes 160, 162, 164 and 166 are moved through operating strokes which start and end at the same time in order to effect the formation of airfoils in the workpiece 42, it is contemplated that the electrodes could have operating strokes which start and/or end at different times and are of different durations.

To provide for the flow of electrolyte during the electrolytic removal of metal from the workpiece 42, a pair of conduits 184 and 186 (see FIG. 5) conduct electrolyte from a pump (not shown) to opposite sides of the fixture module 136. This flow is then conducted inwardly through passages 190 and 192 (FIG. 6) to the working chamber 140. It should be noted that the passages 190 and 192 are connected with relatively small passages extending through the guide elements 142 and 144 to openings which are aligned with the minor sides 52 and 54 of the workpiece. The flow of electrolyte is conducted from the central portion of the workpiece through passages indicated at 196, 198, 200 and 202 in FIG. 6 to drain conduits 204, 206, 208 and 210. The drain conduits 204 and 206 are connected with a single return conduit 214 (see FIG. 5) while the drain conduits 208 and 210 (FIG. 6) are connected with a second return conduit 216 (FIG. 5).

Figure 8:
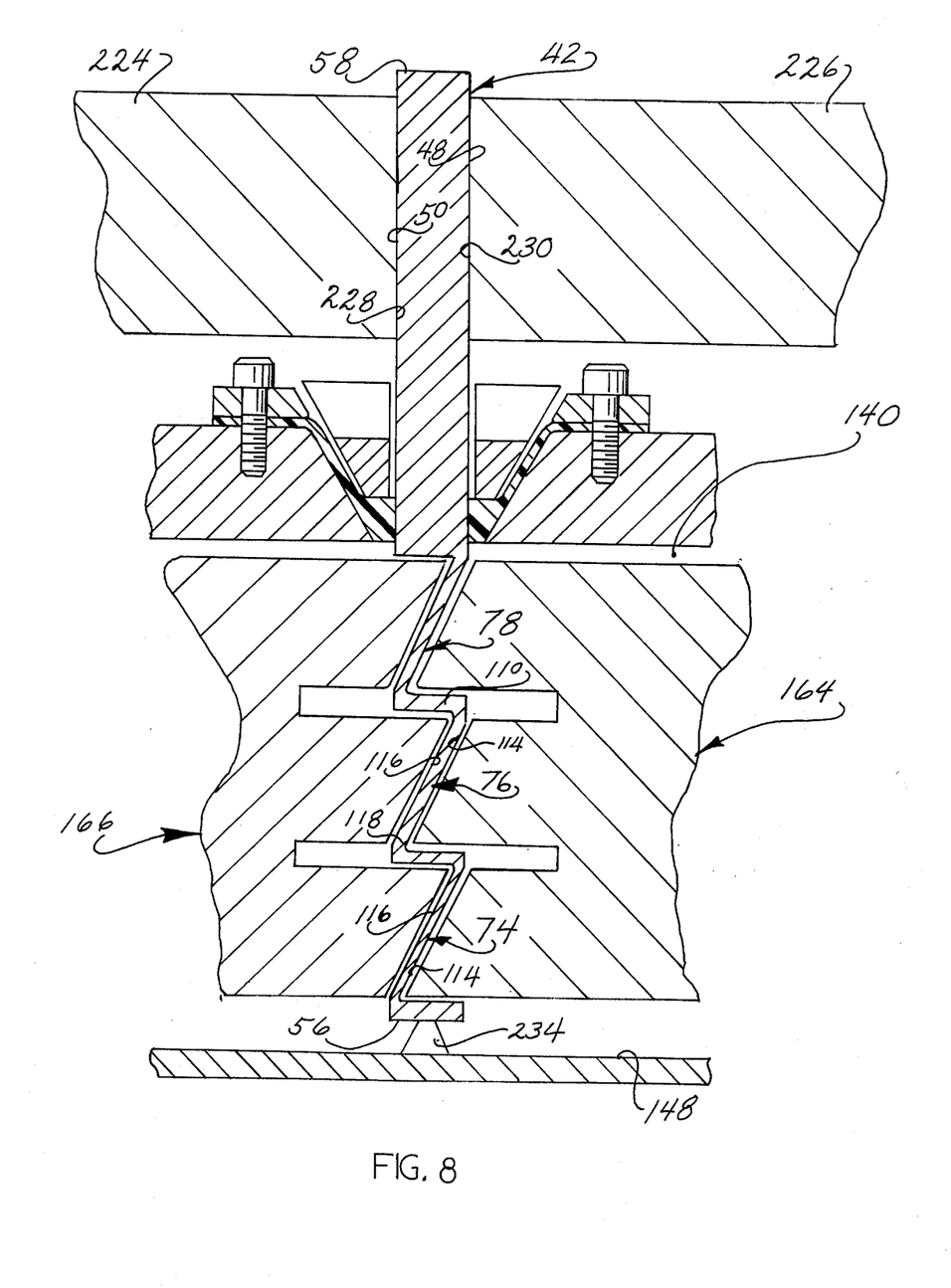
FIG. 8 is a sectional view, taken generally along the line 8—8 of FIG. 7, illustrating the relationship between a workpiece, a pair of cathode electrodes disposed in the working chamber, and a pair of anode electrodes disposed in a secondary chamber during the electrolyte removal of material from opposite sides of the portion of the workpiece in the working chamber.

The workpiece 42 is formed with a length which is twice as great as the length which can be received in the working chamber 140. Thus during a machining operation, one end portion of the workpiece 42 is received in the working chamber 148 and the opposite end portion is received in a secondary chamber 220 (FIG. 8). The electrodes 164 and 166 are effective to form the airfoils 74, 76 and 78 extending in a linear array along the minor side 54 of the workpiece 42 during an initial machining operation in the manner illustrated in FIG. 8. Similarly, the electrodes 160 and 162 (see FIG. 9) are effective to form the airfoils 62, 64 and 66 in a linear array along the minor side 52 of the workpiece 42.

Since the airfoils 62–72 have side surfaces which slope in a direction opposite from the direction of slope of the side surfaces of the airfoils 74–84, offsetting operating forces are applied to the workpiece 42 during the electrolytic removal of material from the workpiece. Thus as viewed in FIG. 8, reaction forces between the electrode 164 and the workpiece 42 tend to urge the workpiece upwardly and leftwardly. Similarly, reaction forces between the electrode 166 and the workpiece 42 tend to urge the workpiece downwardly and rightwardly (as viewed in FIG. 8). Similarly, the reaction forces between the electrode 160 and the workpiece 42 tends to urge the workpiece 42 upwardly and toward the right (as viewed in FIG. 9) while the reaction forces between the electrode 162 and the workpiece tend to urge it downwardly and toward the left.

To form the airfoils 62, 64 and 66 (FIG. 9) and the airfoils 74, 76 and 78 (FIG. 8), the two pairs of electrodes form recesses in the opposite major sides of the workpiece 42 (see FIGS. 2, 3 and 4). The recesses have bottom surfaces formed by the convex and concave sides 114 and 116 of the airfoils. Each recess has a relatively small opening in an associated minor side 52 or 54 of the workpiece. In addition, each recess has a relatively large opening in a major side 48 or 50 of the workpiece. Due to the twist of the airfoil side surfaces 114 and 116, the recess openings in the major sides of the workpiece 42 have a somewhat smaller area than the sides of the airfoils. Although this spatial relationship between the airfoils and the major and minor sides of the workpiece is advantageous, different articles could have different spatial relationships with the sides of the workpiece.

While the cathode electrodes 160, 162, 164 and 166 are forming the airfoils 74, 76, 78, 62, 64, 66 in the end portion of the workpiece 42 adjacent to the minor side 56, a pair of anode electrodes 224 and 226 (FIG. 8) grip the workpiece 42 and hold it against movement. Thus, the anode electrodes 224 and 226 are provided with end face surfaces 228 and 230 which abut the flat rectangular major side surfaces 48 and 50 of the workpiece 42 at the center of the workpiece to hold the workpiece against sidewise movement. In addition, a positioning element 234 engages a suitable hole formed in the center of the minor side 56 of the workpiece 42 to position the workpiece in the center of the working chamber 148. To facilitate positioning of the workpiece 42, the anode electrode 224 is fixedly positioned. The workpiece 42 is clamped against the accurately located reference surface 228 on the fixed anode electrode 224 by the movable anode electrode 226.

Upon completion of the formation of the airfoils 62, 64, 66, 74, 76 and 78 by the simultaneous movement of the electrodes 160, 162, 164 and 166 (see FIGS. 8 and 9), the electrodes are moved back to their retracted positions (FIG. 6) and the anode electrode 226 is retracted. The workpiece is then reinserted into the working chamber 148 with the minor side 58 leading so that the previously formed airfoils 62, 64, 66, 74, 76 and 78 are disposed outside of the working chamber 148 and the opposite end is positioned in the working chamber between the two pairs of cathode electrodes. After the workpiece has been firmly clamped in position by the anode electrodes 224 and 226, the rams 170, 174, 178 and 180 are simultaneously extended while flow of electrolyte is maintained between the workpieces and the cathode electrodes and while the cathode electrodes are maintained at a negative potential relative to the workpiece and the anode electrodes 224 and 226 to electrolytically remove material from the workpiece 42 and form the airfoils 68, 70, 72 adjacent to the minor side 52 and the airfoils 80, 82 and 84 adjacent to the minor side 54 in the manner previously explained. Although the workpiece 42 is stationary during the removal of material from the workpiece, it is contemplated that the clamping electrodes 224 and 226 could both be moved so as to move the workpiece 42 during a metal removing operation.

After forming the airfoils 62, 64, 66, 74, 76 and 78 and after removing the workpiece 42 from the working chamber 148, it is necessary to rotate the workpiece about the vertical axis extending perpendicular to the major side surfaces 48 and 50 of the workpiece before reinserting the workpiece in the working chamber. This results in the electrodes 160 and 162 being utilized to finish the formation of the airfoils along the minor side 54 while the electrodes 164 and 166 are utilized to finish the formation of the airfoils along the minor side 52. Thus, when the workpiece has been reinserted in the working chamber, a pair of cathode electrodes 160 and 162 are moved by the associated rams 170 and 174 to effect the formation of the airfoils 80, 82 and 84 while simultaneously therewith the cathode electrodes 164 and 166 are moved by the associated rams 178 and 180 to form the airfoils 68, 70 and 72 along the minor edge 52.

Figure 9:
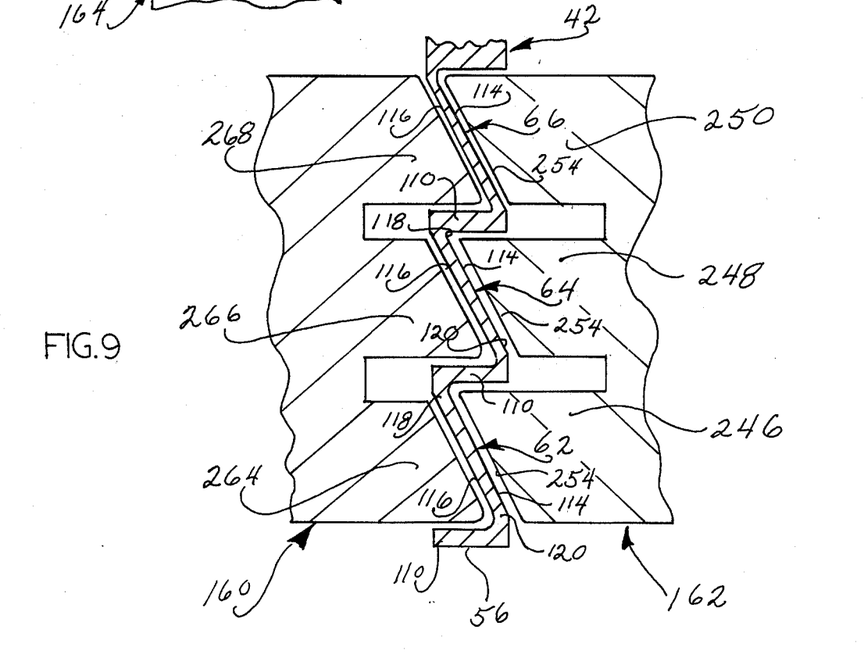
FIG. 9 is a sectional view, taken generally along the line 9—9 of FIG. 7, illustrating the relationship between a second pair of cathode electrodes and the workpiece during the electrolytic removal of material from the workpiece.
Figure 10:
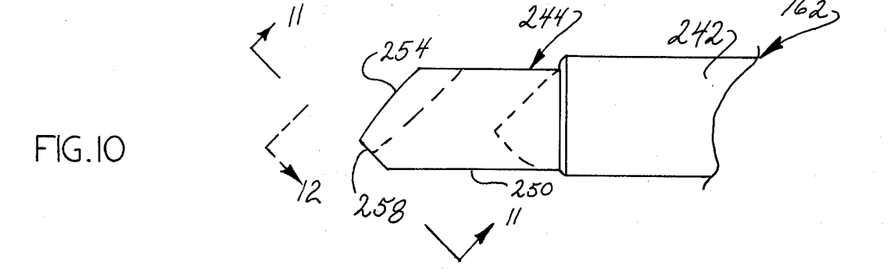
FIG. 10 is a plan view illustrating the construction of an end portion of one of the cathode electrodes.
Figure 11:
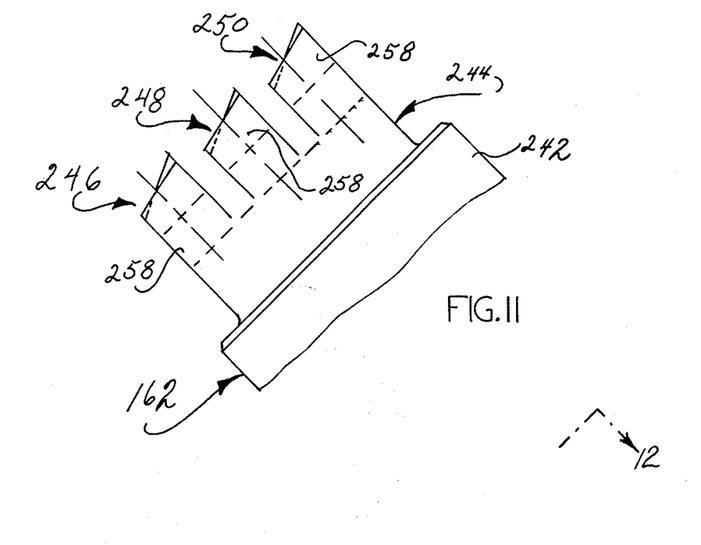
FIG. 11 is an elevational view, taken generally along the line 11—11 of FIG. 10, illustrating the twisted or angled configuration of a plurality of working surfaces formed on the end of the electrode of FIG. 10.
Figure 12:
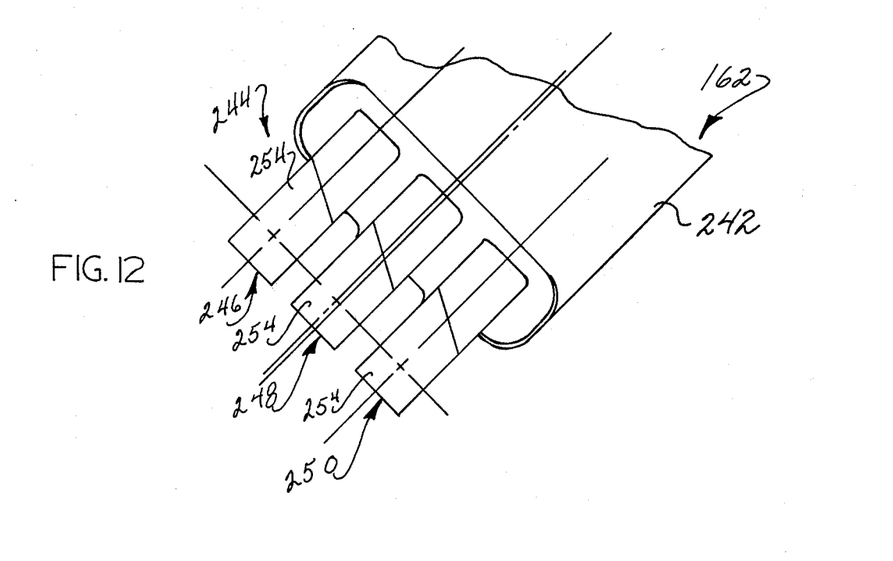
FIG. 12 is an elevational view, taken generally along the line 12—12 of FIG. 10, further illustrating the configuration of the working surfaces on the end of the electrode.

The construction of the cathode electrode 162 is more fully illustrated in FIGS. 10, 11 and 12. The cathode electrode 162 includes a main body portion 242 to which a head end portion 244 is connected. The head end portion 244 has a plurality of spaced apart sections 246, 248 and 250 (see FIGS. 11 and 12). Each of the identical head end sections 246, 248 and 250 is provided with a working or face surface 254 which forms the side surfaces 114 of the airfoils 62, 64 and 66 in the manner illustrated in FIG. 9. In addition, each of the sections 246, 248 and 250 of the cathode electrode 162 is provided with a face surface 258 (see FIGS. 10 and 11) which is effective to form a shoulder surface 260 at the root end of the airfoil in the manner shown in FIG. 7.

The cathode electrode 160, which cooperates with the cathode electrode 162, has three head sections 264, 266 and 268 (FIG. 9). The head sections 264, 266 and 268 of the cathode electrode 160 have face or working surfaces which are complementary to and extend parallel to the face or working surfaces 254 on the head sections of the cathode electrode 162. The construction of the electrode 164 is exactly the same as the construction of the electrode 162. However, the orientation of the electrode 164 is offset by 180° from the orientation of the electrode 162. Similarly, the constuction of the electrode 166 is the same as the construction of the electrode 160.

In the embodiment of the invention illustrated in FIGS. 1-12 the apparatus 44 is utilized to form a plurality of articles, that is the airfoils 62-84 in a unitary workpiece 42. However, in the embodiment of the invention illustrated in FIGS. 13 and 14 the workpiece is not unitary and includes a support frame in which a plurality of partially formed airfoils or other articles are disposed. Since the workpiece illustrated in FIGS. 13 and 14 is somewhat similar to the workpiece 42, similar numerals will be utilized to designate similar components, the suffix letter "a" being associated with the numerals of FIGS. 13 and 14 to avoid confusion.

Figure 13:
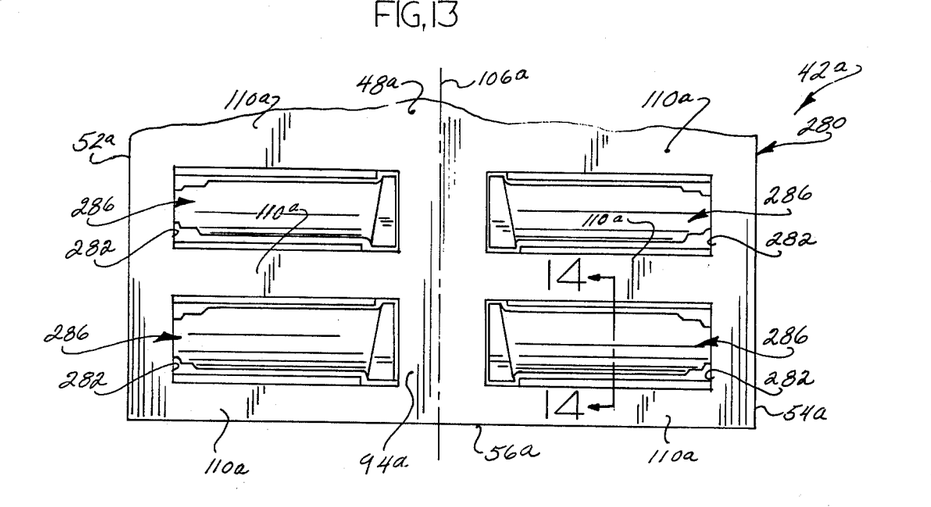
FIG. 13 is a fragmentary plan view of a workpiece having a frame in which a plurality of partially formed airfoils are mounted.
Figure 14:
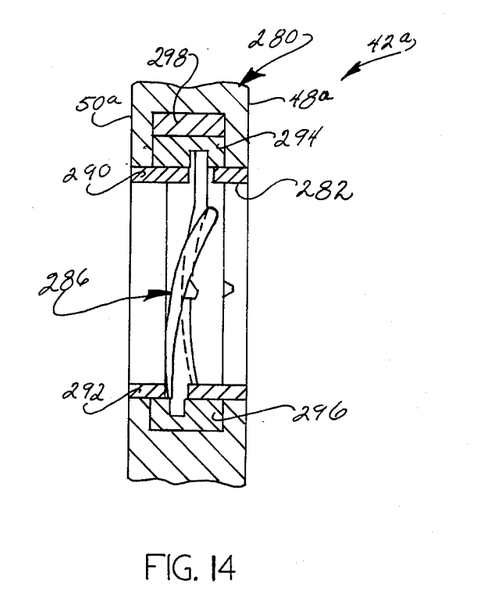
FIG. 14 is a sectional view, taken generally along the line 14—14 of FIG. 13 and illustrating the manner in which a partially formed airfoil is mounted in the frame.

A workpiece 42a is illustrated in FIG. 13 includes a frame 280 in which a plurality of openings 282 are formed. A plurality of partially formed airfoils 286 are disposed in each of the openings 282 in the frame 280. In order to obtain a desired grain structure, the airfoils 286 were forged to a size approaching the size of a completed airfoil. The partially formed airfoils 286 are finished to the desired size and configuration by the apparatus 44 in the manner previously explained in connection with the workpiece 42.

The frame 280 includes a pair of flat parallel major side surfaces 48a and 50a (see FIG. 14) which are interconnected by a first pair of flat parallel minor side surfaces 52a and 54a and a second pair of flat parallel minor side surfaces, only one of which is illustrated in FIG. 13 and is designated by the numeral 56a. The partially formed airfoils 286 are disposed in two linear arrays along the minor side surfaces 52a and 54a of the frame 280 in much the same manner in which the airfoils 62-72 and 74-84 are formed in linear arrays along the minor sides 52 and 54 of the workpiece 42. The partially formed airfoils 286 are disposed in the generally rectangular openings 282 with their central axes extending perpendicular to the minor side surfaces 52a and 54a of the frame 280. It should be understood that although the airfoils 286 are advantageously disposed in the spatial relationship described, certain types of airfoils and other articles could be disposed in different spatial relationships.

The partially formed airfoils 286 disposed in linear array on one side of a central axis 106a of the frame 280 have side surfaces which slope in one direction while the partially completed airfoils disposed on the other side of the central axis 106a of the major side surfaces which slope in the opposite direction. This difference in the angular orientation of the major side surfaces of the airfoils results in the application of offsetting reaction forces to the workpiece 42a during the electrolytic finishing of the partially formed airfoils 286.

The frame 280 includes a plurality of arms 110a which extend outwardly from a main or central body portion 94a of the frame 280. A pair of arms 110a enclose an airfoil 286 in the manner illustrated in FIG. 14.

Opposite longitudinally extending sides of each of the openings 282 are lined with a pair of optional polymeric insulating strips 290 and 292 (see FIG. 14). A pair of longitudinally extending conductor bars 294 and 296 are disposed inwardly of the insulating strips 290 and 292 and are electrically interconnected with the anode electrodes 224 and 226 (see FIG. 8) during the electrolytic machining of a partially completed airfoil 286. The conductor bars 294 and 296 firmly engage the opposite sides of the partially completed airfoil 286 to provide a solid electrical connection between the anode electrodes 224 and 226 (see FIG. 8) and the partially completed airfoil 286. To provide for tight abutting engagement of the conductor bars 294 and 296 with opposite sides of the partially completed airfoil 286, a wedge bar 298 is movable axially, that is longitudinally of the arms 110a, to press the conductor bar 294 toward the conductor bar 296 to thereby clampingly engage opposite sides of the partially completed airfoil 286. Although the construction of only a portion of the frame 280 associated with one of the partially completed airfoils 286 has been illustrated in FIg. 14, it should be understood that the other partially completed airfoils 286 cooperate with similar conducting and wedge bars.

Although the frame 280 has been illustrated in connection with partially completed airfoils, it is contemplated that a frame similar to the frame 280 could be utilized in association with other articles. These articles could be partially formed to a greater or lesser extent. Thus, it is contemplated that an article associated with an opening in a frame similar to the frame 280 could be partially formed to its final configuration by merely cutting a piece of stock material to a length which corresponds to the desired length of the finished article.

Although the workpiece 42a has been shown in FIGS. 13 and 14 apart from the apparatus 44, it should be understood that at least a portion of the frame 280 and the associated partially completed airfoils 286 are received in the working chamber 140 in the same manner as previously described in connection with the workpiece 42. The frame 280 is provided with electrically conductive sections (not shown) which are engaged by the anode electrodes 224 and 226 and are electrically connected with the conductor bars 294 and 296. Although only four openings 282 and partially formed airfoils 286 have been illustrated in FIG. 13, it is contemplated that any desired number of openings and airfoils could be provided in the frame. Of course, the size of the working chamber 140 would provide a limitation on the number of airfoils 286 which could be simultaneously operated on by electrode 160, 162, 164 and 166.

Although the operating relationship of these electrodes to the partially formed airfoils 286 has not been illustrated in the drawings, it should be understood that it is the same as the relationship of the electrodes 160-166 to the workpiece 42. Of course, the head end portions of the cathode electrodes 162-166 would have configurations corresponding to the spacing between the various partially formed airfoils 286 and the configuration of the major side surfaces of these airfoils. Thus, the workpiece 42a cooperates with the apparatus 44 during the electrolytic removal of material from opposing sides of the partially formed airfoils 286 in the same manner as in which the workpiece 42 cooperates with the various components of the apparatus 44. The principal difference between the workpieces 42 and 42a is that the workpiece 42a has a frame with openings which receive partially formed articles while the workpiece 42 has a unitary construction. Of course, if desired, the airfoils 62-84 could be partially formed in the workpiece 42 before the workpiece is operated on by the apparatus 44. This would have the advantage of reducing the time and energy required by the apparatus 44 to finish the workpiece.

In view of the foregoing it can be seen that an improved apparatus 44 for at least partially forming airfoils includes a plurality of pairs of electrodes 160, 162, 164 and 166 which are utilized to simultaneously effect the electrolytic removal of material from opposite sides of the workpiece 42 at spaced apart locations. The airfoils are formed in two separate groups each of which is disposed along an associated minor side surface 52 and 54 of the workpiece. This is accomplished by simultaneously moving each of the electrodes 160, 162, 164 and 166 relative to each other along separate paths extending at acute angles to the major and minor side surfaces 48, 50, 52 and 54 of the workpiece. As the electrodes 160, 162, 164 and 166 are moved toward the workpiece, electrolyte is directed along flow paths which extend axially along the surfaces 114 and 116 of the airfoils. The electrolyte flows from tip end portions 88 and 90 of the airfoils inwardly toward the center of the workpiece to the root portions 92 and 96 of the airfoils. The surfaces 114 and 116 of the airfoils 62-72 along one minor side 52 of the workpiece slope in one direction relative to the major side 48 of the workpiece while the surfaces 114 and 116 of airfoils 74-84 along the other minor side 54 of the workpiece slope in the opposite direction.

Although the workpiece 42 is disclosed herein as having a length which is twice as great as the length which can be received in the chamber 148, the length of the workpiece could be such that the entire workpiece would be enclosed in the chamber 148. In such a case, only three airfoils would be formed along each of the minor sides of the workpiece. Of course, the electrodes 160, 162, 164 and 166 could be sized so as to simultaneously form a greater or lesser number of airfoils along the minor sides of the workpiece. The airfoils 62-84 all have the same configuration. However, it is contemplated that the electrodes 160, 162, 164 and 166 could be shaped so as to form a plurality of airfoils having different configurations.

The workpiece utilized in association with the apparatus can have many different forms. Thus, the workpiece 42 is integrally formed by a single piece of metal. The workpiece 42a is formed by the securely interconnected frame 280 and partially formed airfoils 286. Partially formed airfoils can be mounted in the frame 280 to reduce the amount of material which must be electrolytically removed by the apparatus 44.

Having described specific preferred embodiments of the invention, the following is claimed:

1. An apparatus for electrolytically removing material to form airfoil surfaces in a workpiece having major and minor sides and at least partially composed of an electrically conductive material, said apparatus comprising working chamber means for receiving at least a portion of the workpiece, means for holding at least a portion of the workpiece in said working chamber means, first electrode means movable in said working chamber means in a direction transverse to both the major and minor sides of the workpiece for use in effecting the electrolytic removal of material from the workpiece at each of a plurality of spaced apart locations along a first minor side of the workpiece to form a first plurality of airfoil side surface areas having central axes extending through tip and root portions thereof and intersecting the first minor side of the workpiece at spaced apart locations therealong, second electrode means movable in said working chamber means in a direction transverse to both the major and minor sides of the workpiece and transverse to the direction of movement of said first electrode means for use in effecting the electrolytic removal of material from the workpiece at each of a plurality of spaced apart locations along the first minor side of the workpiece to form a second plurality of airfoil side surface areas opposite the first plurality of airfoil side surface areas and with central axes extending through tip and root portions thereof intersecting the first minor side of the workpiece at spaced apart locations therealong, third electrode means movable in said working chamber means in a direction transverse to both the major and minor sides of the workpiece for use in effecting the electrolytic removal of material from the workpiece at each of a plurality of spaced apart locations along a second minor side of the workpiece to form a third plurality of airfoil side surface areas having central axes extending through tip and root portions thereof and intersecting a second minor side of the workpiece at spaced apart locations therealong, fourth electrode means movable in said working chamber means in a direction transverse to both the major and minor sides of the workpiece and transverse to the direction of movement of said third electrode means for use in effecting the electrolytic removal of material from the workpiece at each of a plurality of spaced apart locations along the second minor side of the workpiece to form a fourth plurality of airfoil side surface areas opposite the third plurality of airfoil side surface areas and with central axes extending through tip and root portions thereof intersecting the second minor side of the workpiece at spaced apart locations therealong, means for establishing an electrical potential between the workpiece and each of said electrode means, means for establishing a flow of electrolyte between each of said electrode means and the workpiece, and means for moving each of said electrode means along paths extending at acute angles to the major sides of the workpiece while the electrical potential is established between each of the pairs of electrode means and the workpiece and while electrolyte is flowing between each of said electrode means and the workpiece to effect the electrolytic removal of material from the major sides of the workpiece at spaced apart locations along the minor sides of the workpiece.

2. An apparatus as set forth in claim 1 wherein said means for establishing a flow of electrolyte includes means for directing a flow of electrolyte inwardly from said first and second minor sides of the workpiece toward the center of the workpiece.

3. An apparatus for at least partially forming articles by electrolytically removing material from a workpiece having opposing sides and at least partially composed of an electrically conductive material, said apparatus comprising working chamber means for receiving at least a portion of the workpiece, means for holding at least a portion of the workpiece in said working chamber means, first and second separately movable electrode means at least partially disposed in said working chamber means for use in effecting the electrolytic removal of material from opposite sides of the workpiece to at least partially form opposing side surfaces of an article, said first and second electrode means being movable toward each other through working strokes during which material is electrolytically removed from opposite sides of the workpiece, said first and second electrode means being movable away from each other through return strokes after material has been electrolytically removed from opposite sides of the workpiece, third and fourth separately movable electrode means spaced apart from said first and second electrode means and at least partially disposed in said working chamber means for use in effecting the electrolytic removal of material from opposite sides of the workpiece to at least partially form opposing side surfaces of an article, said third and fourth electrode means being movable toward said first and second electrode means and toward each other through working strokes during which material is electrolytically removed from opposite sides of the workpiece, said third and fourth electrode means being movable away from said first and second electrode means and away from each other through return strokes after material has been electrolytically removed from the workpiece, means for supporting each of said electrode means for movement relative to each of the other electrode means during movement of said electrode means through their working and return strokes, means for establishing an electrical potential between the workpiece and each of said electrode means during movement of each of said electrode means through its working stroke, means for establishing a flow of electrolyte between the workpiece and each of said electrode means during movement of each of said electrode means through its working stroke, and means for simultaneously moving each of said electrode means through working strokes toward each other while the electrical potential is established between each of said electrode means and the workpiece and during the flow of electrolyte between each of said electrode means and the workpiece to effect the electrolytic removal of material from the workpiece.

4. An apparatus as set forth in claim 3 wherein each of said electrode means includes a plurality of spaced apart working surface means for use in effecting the removal of material from the workpiece at a plurality of spaced apart areas without effecting the removal of material from portions of the workpiece disposed between the spaced apart working surface means.

5. An apparatus as set forth in claim 3 wherein said means for simultaneously moving each of said electrode means includes means for moving each of said electrode means along a path which extends at an acute angle to the opposing side surfaces of the workpiece.

6. An apparatus as set forth in claim 3 said first electrode means has a working surface with a configuration which corresponds to the configuration of a first side of a first article, said second electrode means having a working surface with a configuration which is complementary to the configuration of said working surface of said first electrode means and which corresponds to the configuration of a second side of the first article, said third electrode means having a working surface with a configuration which corresponds to the configuration of a first side of a second article, said fourth electrode means having a working surface with a configuration which is complimentary to the configuration of said working surface of said third electrode means and which corresponds to a second side of the second article, said first, second, third and fourth electrode means being ineffective to remove material from the workpiece in an area between the side surfaces of said first and second articles.

7. An apparatus as set forth in claim 3 wherein said first and second electrode means utilized in the removal of material from a first portion of the workpiece disposed on a first side of a plane extending through a longitudinal central axis of the workpiece in a direction perpendicular to the opposing sides of the workpiece, and said third and fourth electrode means are utilized in the removal of material from a second portion of the workpiece disposed on a second side of the plane extending through a longitudinal central axis of the workpiece in a direction perpendicular to the opposing sides of the workpiece, said second portion of the workpiece being spaced apart from said first portion of the workpiece by an intermediate portion of the workpiece from which said first, second, third and fourth electrode means are ineffective to remove material.

8. An apparatus as set forth in claim 3 wherein the opposing sides of the workpiece are opposing major sides which are interconnected by opposing minor sides, said first electrode means including surface means for use in forming a first recess extending inwardly toward a central portion of the workpiece from a first minor side of the workpiece, said first recess having an opening in a first major side of the workpiece, said second electrode means including surface means for use in forming a second recess extending inwardly toward the central portion of the workpiece from the first minor side of the workpiece, said second recess having an opening in the second major side of the workpiece opposite from the opening to the first recess in the first major side of the workpiece, said third electrode means including surface for use in forming a third recess extending inwardly toward the central portion of the workpiece from the second minor side of the workpiece, said third recess having an opening in the first major side of the workpiece, said fourth electrode means including surface means for use in forming a fourth recess extending inwardly toward the central portion of the workpiece from the second minor side of the workpiece, said fourth recess having an opening in the second major side of the workpiece opposite from the opening to the third recess in the first major side of the workpiece, said first and second recesses being spaced apart from said third and fourth recesses by the central portion of the workpiece.

9. An apparatus as set forth in claim 3 wherein said means for simultaneously moving each of said electrode means includes first motor means for moving said first electrode means relative to each of the other electrode means, said first motor means being operable to move said first electrode means toward and away from the workpiece along a first path disposed at an acute angle to a first side surface of the workpiece, second motor means for moving said second electrode means relative to each of the other electrode means, said second motor means being operable to move said second electrode means toward and away from the workpiece along a second path disposed at an acute angle to a second side surface of the workpiece opposite from said first side surface, third motor means for moving said third electrode means relative to each of the other electrode means, said third motor means being operable to move said third electrode means toward and away from the workpiece along a third path disposed at an acute angle to the first side surface of the workpiece and extending transversely to the first path, and fourth motor means for moving said fourth electrode means relative to each of the other electrode means, said fourth motor means being operable to move said fourth electrode means toward and away from the workpiece along a fourth path extending at an acute angle to the second side surface of the workpiece and extending transversely to the second path.

10. An apparatus as set forth in claim 3 wherein each of the sides of the workpiece has a pair of opposite edge portions and an intermediate portion disposed inwardly from the opposite edge portions at a location between the spaced apart locations where material is removed, said means for establishing a flow of electrolyte including means for establishing a flow of electrolyte along a plurality of flow paths each of which extends between the intermediate portion and one of the edge portions and across an associated one of the spaced apart locations where material is removed.

11. An apparatus as set forth in claim 3 wherein the workpiece has first and second end portions, said working chamber means being effective to enclose one of the end portions of the workpiece with the other end portion of the workpiece disposed outside of said working chamber means.

12. An apparatus as set forth in claim 9 wherein said means for establishing a flow of electrolyte includes means for causing electrolyte to flow along a first flow path extending between the first minor side and central portion of the workpiece through said first recess in a direction with at least a major portion of said first flow path extending generally perpendicular to the first minor side of the workpiece, means for causing electrolyte to flow along a second flow path extending between the first minor side and central portion of the workpiece through said second recess with at least a major portion of said second flow path extending generally perpendicular to the first minor side of the workpiece, means for causing electrolyte to flow along a third path extending between the second minor side and the central portion of the workpiece through said third recess with at least a major portion of said third flow path extending generally perpendicular to the second minor side of the workpiece, and means for causing electrolyte to flow along a fourth flow path extending between the second minor side and the central portion of the workpiece through said fourth recess with at least a major portion of said fourth flow path extending generally perpendicular to the second minor side of the workpiece.

13. An apparatus for at least partially forming a plurality of articles by electrolytically removing material from a workpiece at least partially composed of an electrically conductive material and having opposing major sides interconnected by opposing minor sides, said apparatus comprising working chamber means for receiving at least a portion of the workpiece, means for holding at least a portion of the workpiece in said working chamber means, a plurality of pairs of electrode means movable in said working chamber means relative to each other and to the opposing sides of the workpiece for use in effecting the electrolytic removal of material from the workpiece at each of a plurality of spaced apart locations to at least partially form opposing side surfaces of a plurality of articles, said plurality of pairs of electrode means including first and second pairs of electrode means, said first pair of electrode means including first electrode means for use in forming a first recess extending inwardly toward a central portion of the workpiece from a first minor side of the workpiece, said first recess having an opening in a first major side of the workpiece, and second electrode means for use in forming a second recess extending inwardly toward the central portion of the workpiece from the first minor side of the workpiece, said second recess having an opening in the second major side of the workpiece opposite from the opening to the first recess in the first major side of the workpiece, said second pair of electrode means including third electrode means for use in forming a third recess extending inwardly toward the central portion of the workpiece from the second minor side of the workpiece, said third recess having an opening in the first major side of the workpiece, and fourth electrode means for use in forming a fourth recess extending inwardly toward the central portion of the workpiece from the second minor side of the workpiece, said fourth recess having an opening in the second major side of the workpiece opposite from the opening to the third recess in the first major side of the workpiece, said first and second recesses being spaced apart from said third and fourth recesses by the central portion of the workpiece, means for establishing an electrical potential between the workpiece and said electrode means, means for establishing a flow of electrolyte between the workpiece and said electrode means at each of the plurality of spaced apart locations, and means for moving the electrode means of each pair of electrode means toward each other and transversely to the opposing sides of the workpiece while the electrical potential is established between said electrode means and workpiece and during the flow of electrolyte between said electrode means and workpiece to effect the electrolytic removal of material at the plurality of spaced apart locations to at least partially form a plurality of articles.

14. An apparatus as set forth in claim 13 wherein said means for moving said electrode means includes means for moving each of said electrode means along a path which extends at an acute angle to the opposing side surfaces of the workpiece.

15. An apparatus as set forth in claim 13 wherein said means for establishing a flow of electrolyte including means for establishing a flow of electrolyte in a first direction along a first plurality of flow paths which extend between the central portion and said first minor side of the workpiece through said first and second recesses and for establishing a flow of electrolyte in a second direction opposite to said first direction along a second plurality of flow paths which extend between the central portion and said second minor side of the workpiece through said third and fourth recesses.

16. An apparatus for electrochemically forming a plurality of series of article surface areas in a workpiece which is at least partially formed of an electrically conductive material, said apparatus comprising first and second electrode means for use in simultaneously forming opposite side surface areas of a first series of articles in a first portion of the workpiece, said first electrode means including a first plurality of spaced apart working surfaces each of which has a configuration corresponding to the configuration of a first side surface area of an article of the first series of articles, said second electrode means including a second plurality of spaced apart working surfaces each of which has a configuration corresponding to the configuration of a second side surface area of an article of the first series of articles, third and fourth electrode means for use in simultaneously forming opposite side surface areas of a second series of articles in a second portion of the workpiece, said second portion of the workpiece being spaced apart from said first portion of the workpiece, said third electrode means including a third plurality of spaced apart working surfaces each of which has a configuration corresponding to the configuration of a first side surface area of an article of the second series of articles, said fourth electrode means including a fourth plurality of spaced apart working surfaces each of which has a configuration corresponding to the configuration of a second side surface area of an article of the second series of articles, means for establishing an electrical potential between the workpiece and said working surfaces of each of said electrode means, means for establishing a flow of electrolyte between the workpiece and said working surfaces of each of said electrode means, and means for simultaneously moving each of said electrode means relative to the workpiece while the electrical potential is established between the working surfaces of each of said electrode means and the workpiece and during the flow of electrolyte between the workpiece and the working surfaces of each of said electrode means to effect the simultaneous electrolytic removal of material from the first and second portions of the workpiece and the simultaneous formation of the opposite side surface areas of the first and second series of articles.

17. An apparatus as set forth in claim 16 wherein said means for simultaneously moving each of said electrode means relative to the workpiece includes first motor means connected with said first electrode means for moving said first electrode means along a first path, second motor means connected with said second electrode means for moving said second electrode means along a second path extending transversely to said first path, third motor means connected with said third electrode means for moving said third electrode means along a third path extending transversely to said first path, and fourth motor means connected with said fourth electrode means for moving said fourth electrode means along a fourth path extending transversely to said second and third paths.

18. An apparatus as set forth in claim 16 wherein each of said articles is an airfoil, said working surfaces of said first and second electrode means being disposed so as to effect the formation of the airfoils of the first series of articles with their tip end portions adjacent to a first outer side surface of the workpiece and their root end portions adjacent to a plane extending through the central axis of the workpiece, said working surfaces of said third and fourth electrode means being disposed so as to effect the formation of the airfoils of the second series of articles with their tip end portions adjacent to a second outer side surface of the workpiece and their root end portions adjacent to the plane extending through the central axis of the workpiece.

19. An apparatus as set forth in claim 18 wherein said means for establishing a flow of electrolyte includes means for directing a flow of electrolyte in a first direction along the opposite side surfaces of the first series of articles along flow paths extending between the root and tip end portions of the airfoils of the first series of articles and for directing a flow of electrolyte in a second direction opposite to the first direction along the opposite side surfaces of the second series of articles along flow paths extending between the root and tip end portions of the airfoils of the second series of articles.

20. An apparatus as set forth in claim 16 wherein the workpiece has first and second end portions, said working chamber means being effective to enclose one of the end portions of the workpiece with the other end portion of the workpiece disposed outside of said working chamber means.

21. An apparatus as set forth in claim 16 further including means for supporting each of said electrode means for movement relative to each of the other of said electrode means during the electrolytic removal of material from the workpiece.

22. An apparatus for at least partially forming a plurality of articles by electrolytically removing material from a workpiece having opposing sides and at least partially composed of an electrically conductive material, said apparatus comprising working chamber means for receiving at least a portion of the workpiece, means for holding at least a portion of the workpiece in said working chamber means, a plurality of pairs of separately movable electrode means at least partially disposed in said working chamber means for use in effecting the electrolytic removal of material from the workpiece at each of a plurality of spaced apart locations to at least partially form opposing side surfaces of a plurality of articles, means for supporting each of said electrode means of said plurality of pairs of electrode means for movement relative to each of the other of said electrode means during the electrolytic removal of material from the workpiece, means for establishing an electrical potential between the workpiece and each of said electrode means, means for establishing a flow of electrolyte between the workpiece and each of said electrode means at each of the plurality of spaced apart locations, and a plurality of motor means each of which is connected with an associated one of said electrode means for simultaneously moving each electrode means of said plurality of pairs of electrode means relative to each other and the workpiece while the electrical potential is established between each of said electrode means and the workpiece and during the flow of electrolyte between each of said electrode means and workpiece to effect the electrolytic removal of material at the plurality of spaced apart locations to at least partially form a plurality of articles.

23. An apparatus as set forth in claim 22 wherein each of said electrode means includes a plurality of spaced apart working surface means for use in effecting the removal of material from the workpiece at a plurality of spaced apart areas, each of said spaced apart working surface means of one electrode means of a pair of electrode means being disposed opposite from a working surface means of the other electrode means of the pair of electrode means during the electrolytic removal of material from the workpiece to at least partially form opposite side surfaces of an article.

24. An apparatus as set forth in claim 22 wherein said plurality of motor means for moving said plurality of pairs of electrode means includes means for moving each of said electrode means along a path which extends at an acute angle to the opposing side surfaces of the workpiece.

25. An apparatus as set forth in claim 22 each pair of electrode means includes a first electrode means having a working surface with a configuration which corresponds to the configuration of one side of an article and a second electrode means having a working surface with a configuration which is complementary to the configuration of said working surface of said first electrode means and which corresponds to the configuration of a side of an article opposite from the one side.

26. An apparatus as set forth in claim 22 wherein the workpiece has first and second end portions, said working chamber means being effective to enclose one of the end portions of the workpiece with the other end portion of the workpiece disposed outside of said working chamber means.

27. An apparatus as set forth in claim 22 wherein one of said pairs of electrode means is utilized in the removal of material from a portion of the workpiece disposed on a first side of a plane extending through a longitudinal central axis of the workpiece and perpendicular to the opposing sides of the workpiece, and another of said pairs of electrode means is utilized in the removal of material from a portion of the workpiece disposed on a second side of said plane extending through a longitudinal central axis of the workpiece.

* * * * *

UNITED STATES PATENT AND TRADEMARK OFFICE
CERTIFICATE OF CORRECTION

PATENT NO. : 4,052,284
DATED : October 4, 1977
INVENTOR(S) : Gustav E. Schrader

It is certified that error appears in the above-identified patent and that said Letters Patent are hereby corrected as shown below:

Column 14, line 9, after "means" insert --are--.

Column 15, line 44, after "third" insert --flow--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks